(12) United States Patent
Charych

(10) Patent No.: US 7,155,304 B1
(45) Date of Patent: Dec. 26, 2006

(54) RF IDENTIFICATION APPARATUS FOR PALLET CONVEYANCES

(75) Inventor: Harold Charych, Poquott, NY (US)

(73) Assignee: EPC4ROI Limited Partnership ( * ) Notice: Subject to any disclaimer, the term of this patent is extended or adjusted under 35 U.S.C. 154(b) by 43 days.

(21) Appl. No.: 11/155,054

(22) Filed: Jun. 17, 2005

(51) Int. Cl.
*G06F 7/00* (2006.01)

(52) U.S. Cl. ...................................... 700/214; 700/213

(58) Field of Classification Search ................ 700/213, 700/214; 343/711, 723, 883, 901
See application file for complete search history.

(56) References Cited

U.S. PATENT DOCUMENTS

| 6,573,868 B1* | 6/2003 | Johnson et al. ............. 343/702 |
| 6,600,418 B1 | 7/2003 | Francis et al. ........... 340/572.1 |
| 6,669,089 B1 | 12/2003 | Cybulski et al. ............ 235/385 |
| 2005/0071234 A1 | 3/2005 | Schon .......................... 705/22 |
| 2006/0036346 A1* | 2/2006 | Andersen et al. ........... 700/213 |
| 2006/0058913 A1* | 3/2006 | Andersen et al. ........... 700/214 |

* cited by examiner

*Primary Examiner*—Khoi H. Tran
(74) *Attorney, Agent, or Firm*—Brown & Michaels, PC

(57) ABSTRACT

Apparatus for reading RFID tags of picked goods as they are loaded onto a picked pallet, and a method of picking and tracking goods using the device. The invention is mounted on a pallet support on a pallet conveyance, and has an RFID interrogator connected to at least one antenna mounted on a vertically movable antenna mount. The interrogator triggers the transponders in the goods and sends the decoded replies to the control unit. An object sensor adjacent to the antenna senses the presence of goods, and a control unit controls the movable antenna mount to raise the antenna mount above the goods. A computer having a display visible to an operator loading the pallet conveyance is used to communicate with the operator, confirming the loaded goods are the correct ones, and tracking inventory loaded on the conveyance. A barcode reader may be located on the antenna mount.

29 Claims, 4 Drawing Sheets

RF IDENTIFICATION APPARATUS FOR PALLET CONVEYANCES

BACKGROUND OF THE INVENTION

1. Field of the Invention

The invention pertains to the field of registers for reading and displaying data pertaining to goods. More particularly, the invention pertains to apparatus and methods for identifying and tracking picked goods on a pallet conveyance using RF identification transponders (RFID tags) associated with the goods.

2. Description of Related Art

Pallets are a cost effective means used to ship products from the point of manufacture to distribution centers and finally to retailers where the merchandise is sold to the general public. Retailers need to know what goods are in the supply chain in order to make better business decisions and to make sure that goods are on the store shelves when consumers want to purchase them. Mandates from major retailers such as Wal-Mart, Target, Best Buy, Metro, and others are requiring that cases, cartons, and shipping totes, primarily shipped on pallets (hereinafter, simply "cases"), have Radio Frequency Identification transponders, commonly called "RFID tags" attached to identify the product content.

Manufacturers and distribution centers receive orders from stores for a variety of merchandise. The order is typically "picked" which means that a manufacturer or distribution center uses a pallet that is carried on the forks of a pallet conveyance, which may be a forklift truck, motorized pallet jack, manual pallet jack, or other such vehicle, onto which goods from a "pick list" are loaded for delivery to a given location. The operator will move the pallet via the conveyance to an area of the warehouse where merchandise listed on the pick list is stored. The operator will then add the number of cases listed on the pick list to the pallet. This pallet will now be called the "picked pallet", and the goods "picked goods".

The manufacturer or the distribution center would like to know that the right merchandise was loaded onto the picked pallet. Prior art used barcodes read with a handheld barcode scanner as a way to insure accuracy. As each item is added to the picked pallet, the barcode printed on the case is scanned with a hand held scanner. A computer system is used to check that the right merchandise was picked. This process is time consuming and depends on the operator to manually scan each case.

Prior art, such as U.S. Pat. No. 6,669,089, describes methods of reading an RFID tag on one or more pallets loaded on the forks of the forklifts. The patent does not address a method of reading RFID tags on individual cases loaded onto pallets. The antennas in this patent are fixed to the forklift structure (either to the moving fork structure, or the fixed vertical support), and are not independently movable apart from the normal raising and lowering of the forks.

Reading the RFID tags attached to cases as they are loaded onto a picked pallet has proven to be difficult using prior art. The operator can park the forklift or other pallet conveyance vehicle with the picked pallet anywhere in the warehouse. Because the RF field generated by the RFID reader and antenna is imprecise and may bounce off metallic objects in the warehouse, such as the metal shelves, it is difficult to know if the item is on the picked pallet or near it. As goods are loaded onto the picked pallet, antennas that were visible before are now covered with merchandise. Depending on the type of merchandise, the RF signal from the reader will become blocked and no additional RFID tag reading will take place.

Published Patent Application no. 2005/0071234 describes a pallet picking operation in detail. The application makes the assumption that if there is an RFID reader it will read the tag of items placed on the pallet, but does not discuss the placement of the RFID reader antennas with respect to the RFID tags on the cases. This location and proximity between the tags and the antennas is critical if the tags are going to be read correctly—or at all. As an example, paragraph 0016 states "Once on the pallet the RF reader for the pallet identifies the item and logs the item into the pallet's inventory. At the same time the forklift's RF reader reads the RF tag of the item and identifies the item in the pick list". This requires knowing the location of the antennas of the forklift RF reader, and the location of the antennas of the pallet RF reader. The forklift is a metallic structure and RF waves from the forklift may be blocked in many cases. The pallet and forklift RF readers and antennas are not described at all.

SUMMARY OF THE INVENTION

The invention is an apparatus that will read the RF identification transponders (RFID tags) of picked goods as they are loaded onto the picked pallet, and a method of picking and tracking goods using the device. Human error is reduced and the picking process can be accomplished much faster.

The invention is mounted on a pallet support of a pallet conveyance such as a forklift, pallet jack, or the like, having pallet supports (such as the "forks" of a forklift) which engage the pallet. The apparatus has an RFID interrogator for triggering the RFID transponders on picked goods and receiving and decoding replies.

The interrogator is connected to at least one antenna mounted on a vertically movable antenna mount, which is moveable from a base level to a level at least even with the top of a load of picked goods on the pallet support. The base level is approximately even with the pallet on the conveyance.

As goods are loaded onto the picked pallet an interrogator triggers the transponder in the goods and sends the decoded replies to the control unit. If the goods are placed onto the picked pallet blocking the antenna, an object sensor adjacent to the antenna senses the presence of goods, and a control unit controls the movable antenna mount to raise the antenna mount above the goods.

A computer having a display which is visible to a user loading the pallet conveyance is used to communicate with the user, confirming that the goods the user has loaded are the correct ones, and tracking the inventory loaded on the conveyance.

Another aspect of the invention is a semi-automatic method of reading barcode labels. The bar coded labels and the RFID tags are usually on the same face of the case. Because the vertical movement of the antenna attempts to maintain a line of sight from the antennas to the newly loaded cases, bar code reading is possible. A bar code reader device can be either a laser scanner or digital camera imager. It will be optionally mounted next to the antenna section. Preferably, a motion sensor next to the bar code scanner will trigger scanning when a new case is loaded onto the picked pallet, but other triggering methods are also possible within the teachings of the invention.

DETAILED DESCRIPTION OF THE INVENTION

The forklift RFID reading apparatus of the invention is self contained and may be used on any number of pallet conveyances including, forklifts, stock pickers, motorized pallet jacks, manual pallet jacks, and other conveyances that have forks that engage the pallet. In the description below these pallet conveyances may be referred to as "forklifts", but it will be understood that any such conveyance is possible.

Figure 1:
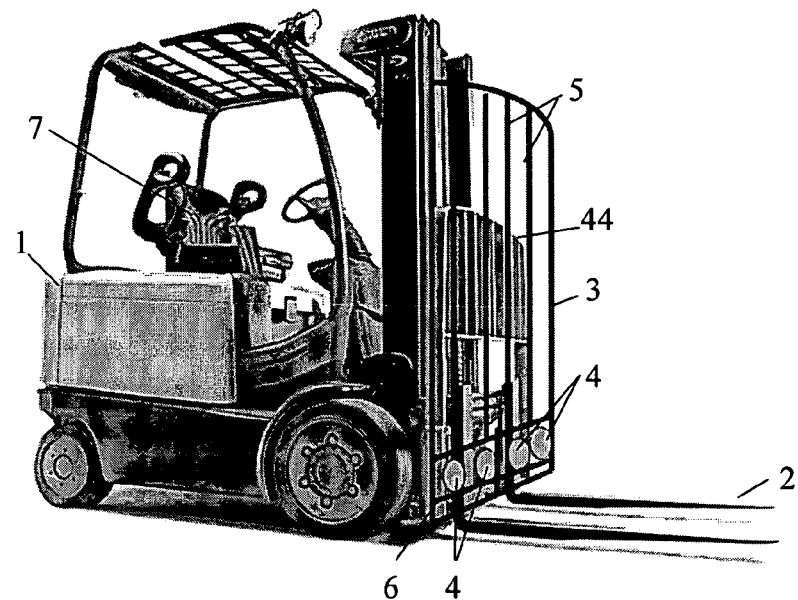
FIG. 1 shows a forklift having the apparatus of the invention mounted on its forks.

FIG. 1 shows how the invention might be mounted upon a forklift truck (1), which has a vertically movable set of pallet forks (2) mounted on its front end. The forks (2) are slipped underneath a pallet, which is a flat support for goods having space underneath for the forks. Such forklifts (1) are typically driven by an operator seated (7) on the vehicle, although some, often referred to as "stock pickers," have the driver's position on the fork portion, so that the operator can ride up with the forks to move goods from the upper levels of a warehouse.

Figure 2:
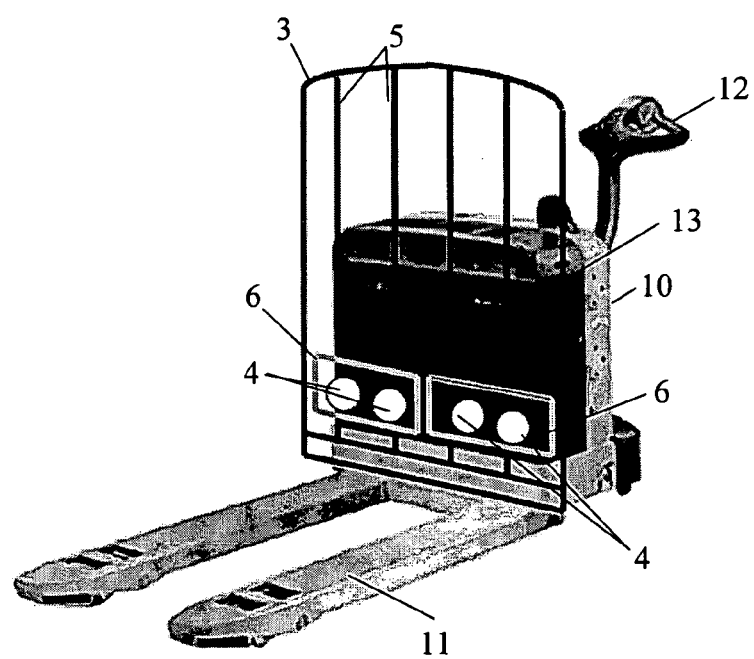
FIG. 2 shows a pallet jack having the apparatus of the invention mounted on its forks.

FIG. 2 shows the invention as it might be mounted on a motorized pallet jack (10). The jack has forks (11) to slip under pallets, and is moved by motors controlled by an operator walking with the truck, operating and steering with controls on a handle (12).

Both figures show the vertically movable antenna mounts (6), sliding on their risers (5), each with two antennas (4) for interrogating the RFID tags on goods on pallets on the forks.

The apparatus is mounted on its own pallet guard frame (3) and rests on the forks (2) or (11) of the pallet conveyance vehicle (1) or (10). The apparatus may be secured to the pallet guard (44) of the forklift (1), or it may be secured to the battery compartment (13) of the motorized pallet jack (10), or to any structure located at the base of the forks. Any type of mechanical arrangement may be used to hold the apparatus in place, with the weight of the apparatus carried by the forks (2)(11) of the conveyance.

Figure 3:
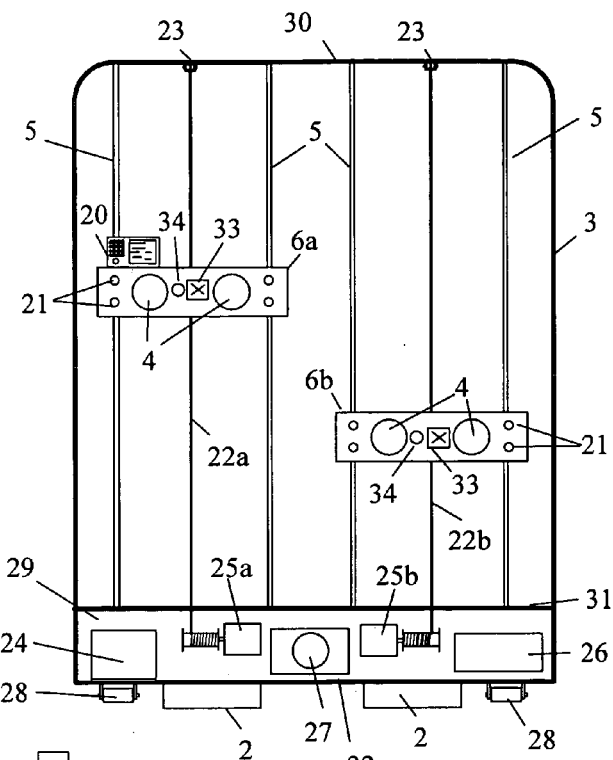
FIG. 3 shows a front-view diagram of the invention.
Figure 4:
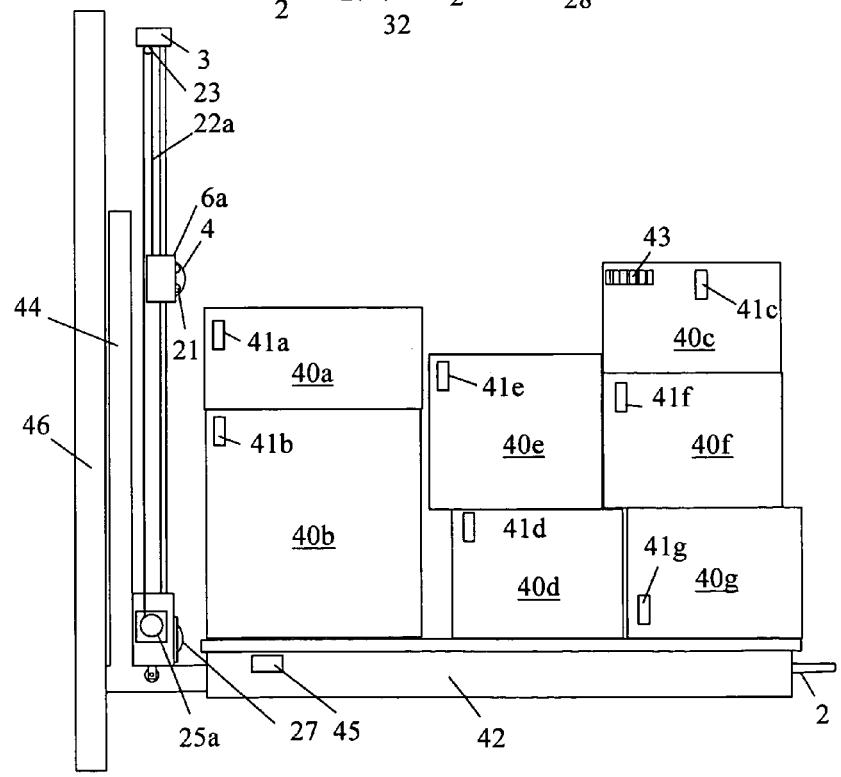
FIG. 4 shows a side-view diagram of the invention.

FIGS. 3 and 4 show a simplified drawing of an embodiment of the apparatus of the invention.

The pallet (42) is lifted by the forks (2) of the pallet conveyance (1) or (10). A pallet guard (44) is a part of the pallet conveyance, attached to and moving with the forks (2). The pallet guard (44) prevents the pallet (42) and any goods stacked on the pallet from moving into the lift rails (46) and lifting mechanism of the conveyance.

Frame (3) provides a structure on which the apparatus of the invention is constructed, with the guide rails (5) running between a top rail (30) and a middle rail (31). Pulleys (23) can be mounted on the top rail (30), for cables (22a)(22b) controlling the height of the antenna mounts (6a)(6b). Middle rail (31) and bottom rail (32) form a compartment for mounting the operational components of the invention, such as control unit (26), RFID interrogator (24), pallet antenna (27), motors (25a) and (25b), and possibly batteries or power supplies or other components, as needed. Wheels (28) may be mounted on the bottom rail (32) to allow the frame to be moved easily from conveyance to conveyance, or to be removed for service or storage.

The preferred embodiment shown in these figures has two antenna mounts (6a) and (6b), aligned with the left and right sides of the pallet (42) on the forks (2), although it will be understood that one or more antenna mount assemblies could be provided within the teaching of the invention. The antenna mounts (6) are independently movable on risers (5) from a lower base level at or near the level of the pallet (42), up to a top level which is at least even with the highest (40e) of the goods (40a)-(40g) which are piled on the pallet (42). Preferably, the top level is about 80 inches (203 cm) above the base (pallet) level.

Each antenna mount (5) has one or more antennas (4) for interrogating RFID tags (41a)-(41g) in the goods (40a)-(40g), and also one or more object sensors (21) for sensing the proximity of objects aligned with the sensors. Preferably, each mount has two antennas (4). The antennas can preferably be low gain and the outer antennas can preferably be angled in. The antennas on the right and left side of the pallet will help determine if a case is on the pallet or off. Software algorithms, such as reading a RFID tag multiple times with both antennas will determine whether a tag is on the pallet or just adjacent to it. The combination of manual and automatic feedback will further confirm that the right merchandise was loaded.

The object sensors (21) near the antennas (4) are used to determine the height of the merchandise (40a)-(40g) loaded on the picked pallet (42) and will keep the antennas (4) several inches above the highest layer (40c). Thus, as new merchandise (40c) is loaded, the RFID tags (41c) of the new merchandise will be visible to the antennas (4).

In certain circumstances of warehouse picking, some items may have a RFID transponder and others may not. Having a bar code reading apparatus will help identify cases that do not have a RFID transponder or that have a defective RFID transponder. Therefore, preferably, there is also a bar code reader (33), which could be a digital camera imager or a laser bar code scanner, mounted next to the object sensors (21) and antennas (4) on each antenna riser. Because the vertically movable antennas maintain a line of sight to the newly added cases, this will allow the bar code scanner to work properly. Preferably, a motion sensor (34) is mounted next to the barcode reader (33), which is used to trigger the barcode reader.

Figure 6:
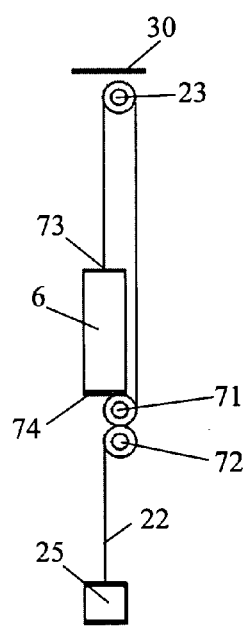
FIG. 6 shows a diagram of a cable management arrangement for use with the invention.

FIG. 6 shows a preferred embodiment of a cable management scheme for minimizing problems with the cables (22) running between the movable antenna mounts (6) and the motor (25), interrogator (24) and controller (26).

The cable (22) from the movable antenna mount (6) exits from the top section (73) of the mount (6). It goes up and through a pulley (23) at the top rail (30). It then comes down to the bottom (74) of the antenna mount (6), where it goes through two pulleys (71)(72). Using this arrangement of pulleys will allow a fixed length cable to be used as the antenna mounts move up and down.

An optional fifth antenna (27) can be mounted adjacent to the pallet (42) on top of the forks (2) in or on the equipment compartment (29). This fifth antenna (27) can be used to read a pallet tag (45), if one is used, when the forks (2) engage the pallet (42). This antenna (27) can also read shelf tags, if they are used, when the pallet is loaded into a storage area of the warehouse.

A user interface (20) having a display which is visible to an operator while loading the pallet conveyance, as well as preferably a keypad for input and an audio output, is used to communicate with the operator, confirming that the goods the operator has loaded are the correct ones, and tracking the inventory loaded on the conveyance. The keypad and display should be visible and available to the operator at the point of activity, during the loading of the pallet. The operator will immediately see that the wrong item was loaded and can take corrective action. Finding out that the wrong items were loaded when the operator gets back into the cab could make the operator reluctant to go out and change the item, fearing more time will be lost.

The interface (20) will preferably be mounted on top of one of the antenna mounts (6), fully visible while the operator is loading cases. This will allow the operator to get immediate feedback that the RFID tags of the cases that were just loaded have been read and correctly identified by the device.

Figure 5:
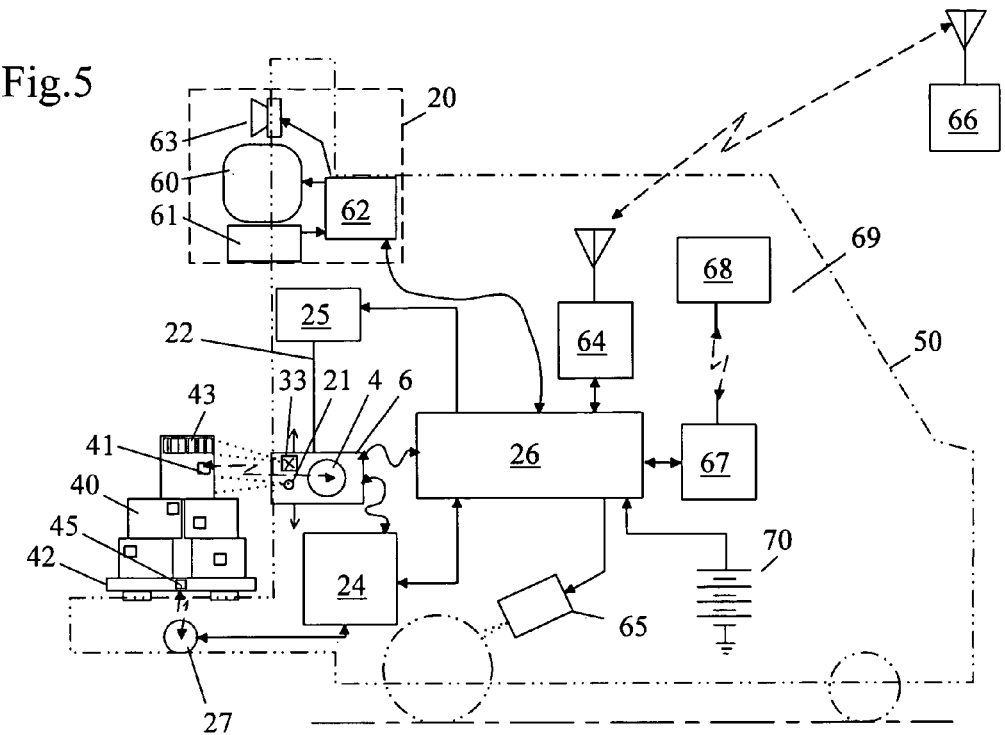
FIG. 5 shows a block diagram of the interconnection of the parts of the invention.

FIG. 5 shows a block diagram of the invention.

Controller (26) communicates with the various components of the invention, as well as controlling the lift motors (25) for positioning the antenna mounts (6).

The user interface (20) includes display (60), and preferably keypad (61) and audio output (63). The interface may be controlled by its own computer (62), or the interface control might be built into the main controller (26).

Interrogator (24) provides the radio-frequency (RF) transmitter and receiver to send signals to antennas (4) (and (27), if so equipped), and thus to the RF transponders (RFID tags)(41) and (45), and to receive responses from the tags (41)(45) through antennas (4) and (27). The interrogator (24) may also contain encoder/decoder and control logic, so that the main controller (26) will receive decoded data. Alternatively, this logic may be included as part of the main controller (26) itself.

The controller (26) receives signals from the object sensors (21), and also from the barcode reader (33), if the apparatus is so equipped.

In a preferred embodiment, a pallet vehicle motion sensor (65) will also be part of this invention. The motion sensor (65) will determine when the conveyance is in motion, and will send signals to the controller (26) accordingly.

The main controller (26) can interface to the infrastructure system of the warehouse (66) via a wireless link (64). This link can be the industry standard 802.11 a/b/g, or any other wireless communication system that might be desired. The controller (26) can also communicate through a short range wireless system (67), such as Bluetooth®, to a vehicle radio computer (VRC) (68) in the cab (69) of the forklift (50). However, the apparatus will have most of the functionality of a VRC and can reduce the overall cost by eliminating the VRC.

Preferably, the apparatus will be powered by rechargeable batteries (70) and may be recharged at night or when the forklift is not in use. Alternatively, the invention can run off the electrical system of the forklift.

Figure 7:
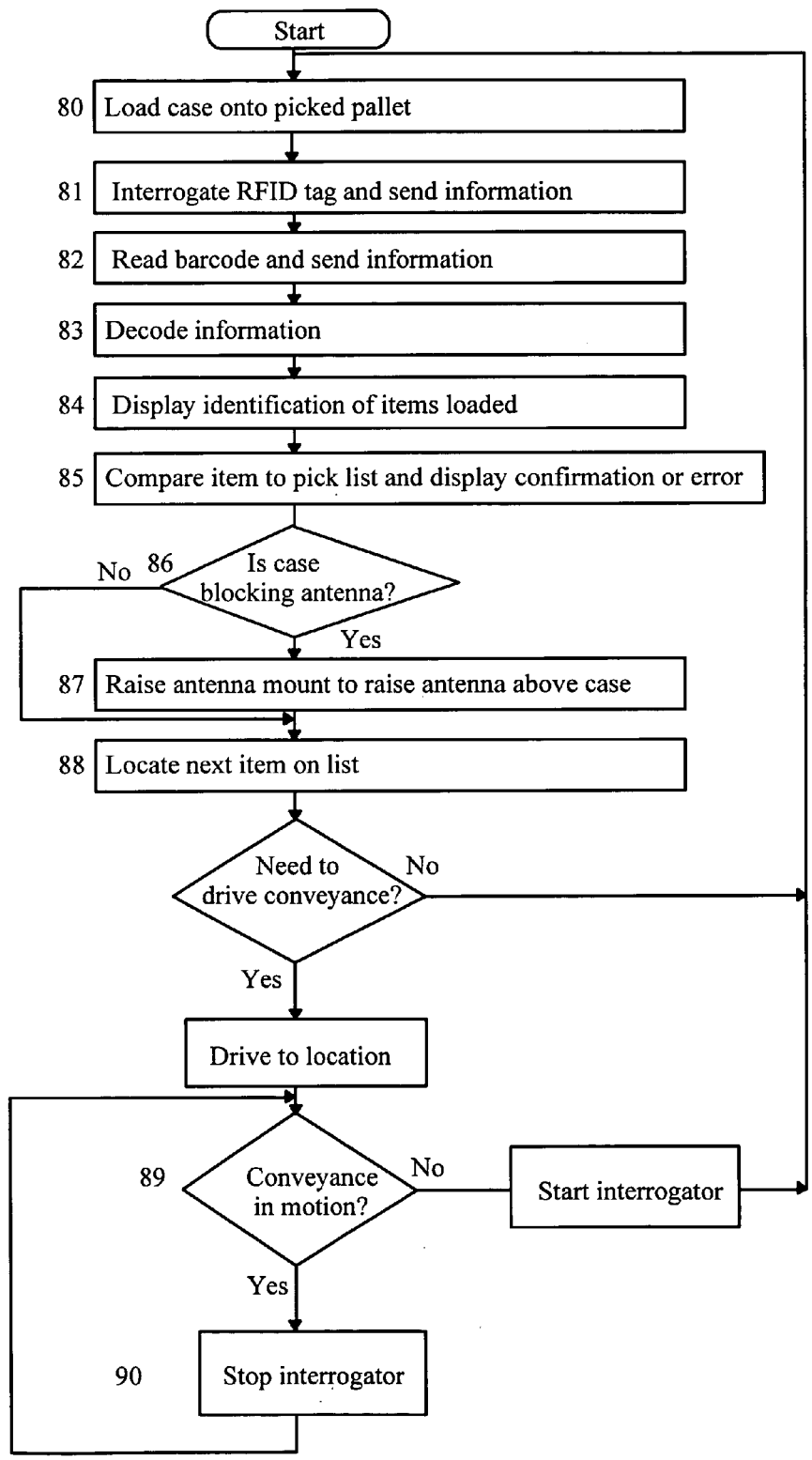
FIG. 7 shows a flowchart of the method of the invention.

FIG. 7 shows a flowchart of the method of the invention, which uses the apparatus described above. Paragraph numbers below refer to the numbered steps in the flowchart of FIG. 7.

The method typically starts with an empty pallet. The antenna mounts are at the base level, and, preferably, the interrogator is "on", ready to read an RFID tag.

80. The operator loads the case (or possibly more than one case) (40e) onto the picked pallet (42) with the RFID transponder (41e) facing the antenna (4).

The bar code (43) that identifies the contents of the case (40e) will also be located on the same face of the case as the RFID transponder (41e) (for the purposes of FIG. 4, these are shown facing the viewer, but it will be understood that they would really face the antenna (4) and barcode reader (33)).

It will be understood that in some circumstances, instead of starting with an empty pallet and placing a case on the empty pallet, the method may start out by picking up a pallet which is already partially full. As an example, imagine that a full pallet was received from a manufacturer. In this case the contents of the pallet are known to the warehouse database. The database will also know the cases that were removed from the pallet in previous picking operations. The apparatus of the invention will know the identification of the pallet by reading the pallet transponder (45) (if one is present) with fixed antenna (27), and communicating with the warehouse computer to determine the contents of the pallet, or by reading the cases that face the antennas as the antennas travel vertically to get to the top of the load and associating the cases with a known pallet already in the warehouse database.

In such a situation, this step of "loading a case" will comprise putting the partially loaded pallet having one or more cases loaded upon it on the pallet support of the conveyance. The cases on the pallet are determined by the process described above to load the identifications of the case(s) expected to be loaded on the pallet. The method can then proceed with the following steps.

81. The interrogator (24) interrogates the RFID tag (41) on the case (40), and the information from the tag is sent to the controller (26)

82. If the apparatus is so equipped, a motion sensor (34) next to the barcode reader (33) can trigger the barcode reader (33) to either take a picture of the newly added case or scan the case with a laser beam, and the barcode information is also sent to the controller.

83. The controller software will decode the information from the RFID tag (and bar code). If necessary, and if the apparatus is so equipped, the controller (26) may communicate through the wireless link (64) with the warehouse computer (66) to translate the information, coordinate the picking, or other tasks.

84. The display (60) in the user interface (20) will display information to allow the operator to confirm that the case picked was a correct one. It is important to note that the display should show the actual items loaded, such as "case of soap—24 count", rather than just the RFID tag number. The display may be programmed to show the total number of items and possibly the corresponding RFID tags read since the picking operation was started. It may also show the total number of items and possibly the corresponding RFID tags read since the conveyance last stopped.

In the situation indicated in step 80, above, where the initial loading comprised picking up a partially loaded pallet, the identity of the cases whose transponders and/or barcodes face the antennas can be read and confirmed as indicated here. It is possible that the transponders or barcodes on some cases on the pre-loaded pallet might not be visible to the antennas or barcode readers, in which case the display could indicate which cases were not detected and have the operator visually confirm that they are there.

85. Optionally, the controller (26) may compare the case picked with a pick list, to be sure that the case was intended to be picked, and can display messages and/or initiate an audible alarm to the operator if there has been an error, or, alternatively, can display a confirmation on the display and/or through an audible means.

86. If the object sensor (21) senses that the case is blocking the antenna (4), then (step 87) the controller (26) controls the motor (25) to raise the antenna mount (6) until the antenna (4) is positioned to read the transponder (41) on the next case (40).

88. The operator locates the next item on the pick list, drives the conveyance to another location if needed, and repeats the method from step (80), above.

With the conveyance in motion, detected by motion detector (65), the apparatus controller (26) will stop the interrogator (26) from reading tags to prevent extraneous reads. Picked pallet loading only occurs when the conveyance is stopped and the RFID reader will be activated during that time.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An apparatus for reading RF identification transponders in picked goods loaded on a pallet conveyance having a pallet support for conveying the picked goods, comprising:
   a) an RFID interrogator for triggering the transponders and receiving and decoding replies;
   b) at least one vertically movable antenna mount, mounted to the pallet support for movement therewith, the mount being moveable from a base level adjacent to a pallet supported by the pallet support to a level at least even with the top of a load of picked goods on the pallet support;
   c) at least one antenna mounted to the antenna mount and coupled to the interrogator;
   d) at least one object sensor adjacent to at least one antenna;
   e) a control unit coupled to the interrogator for initiating interrogation of transponders and accepting decoded replies, to the antenna mount for controlling the level of the antenna mounted on the mount, and to the object sensor for detecting the presence of goods adjacent to the object sensor,
   such that when picked goods are loaded on the pallet support, the interrogator triggers the transponders in the goods and sends decoded replies to the control unit, and if the object sensor senses the presence of the goods blocking the antenna, the control unit controls the movable antenna mount to raise the antenna mount above the goods.

2. The apparatus of claim 1, in which there are four antennas.

3. The apparatus of claim 1, in which there are at least two antenna mounts, mounted on at least a right side and a left side of the pallet support.

4. The apparatus of claim 3, in which each antenna mount has an object sensor mounted adjacent to its antenna, and the level of each pair of antennas is adjustable independently.

5. The apparatus of claim 3, in which there are two antennas on each mount.

6. The apparatus of claim 1, further comprising a fixed antenna mounted adjacent to the pallet support and coupled to the interrogator.

7. The apparatus of claim 1, further comprising a computer having a user input, a visual display and control input and output coupled to the control unit.

8. The apparatus of claim 7, in which the computer is programmed to display a total of items and transponders read since a pallet picking operation was initiated.

9. The apparatus of claim 7, in which the computer is programmed to display a number of items and transponders read since the pallet conveyance stopped.

10. The apparatus of claim 7, in which the computer is programmed to display at least one pick location.

11. The apparatus of claim 7, in which the computer has an audio output, and the computer is programmed to provide audio feedback when an RF transponder is read.

12. The apparatus of claim 7, in which the keypad and display are visible and available to a user during a pallet loading process.

13. The apparatus of claim 1, in which the computer is coupled to the control unit using wireless communications.

14. The apparatus of claim 1, further comprising a motion sensor for determining when the conveyance is moving.

15. The apparatus of claim 1 further comprising a wireless communication transceiver for communicating with a warehouse infrastructure system.

16. The apparatus of claim 1, in which the interrogator, antenna mounts, antennas and control unit are mounted to a frame which is removably mounted to the pallet support.

17. The apparatus of claim 16, in which the frame further comprises a plurality of wheels on a bottom of the frame, for moving the frame across a surface.

18. The apparatus of claim 1, further comprising a barcode reader mounted on the antenna mount adjacent to, and aligned with, the object sensor, and coupled to the controller.

19. A method of identifying picked goods having RF identification transponders while the goods are loaded on a picked pallet conveyance having a pallet support for conveying the picked goods, and a reading apparatus comprising an RFID interrogator for triggering the transponders and receiving and decoding replies; at least one vertically movable antenna mount, mounted to the pallet support for movement therewith, the mount being moveable from a base level adjacent to a pallet supported by the pallet support to a level at least even with the top of a load of picked goods on the pallet support; at least one antenna mounted to the antenna mount and coupled to the interrogator; at least one object sensor adjacent to at least one antenna; a controller coupled to the interrogator for initiating interrogation of transponders and accepting decoded replies, to the antenna mount for controlling the level of the antenna mounted on the mount, and to the object sensor for detecting the presence of goods adjacent to the object sensor, the method comprising the steps of:
   a) loading a case onto the picked pallet with the RF identification transponder facing the antenna;
   b) interrogating the transponder in the case, and sending information from the transponder to the controller;
   c) decoding the information from the transponder;
   d) displaying on a user interface identification of items loaded;
   e) using the object sensor, detecting if the case is blocking the antenna, and if the case is blocking the antenna, raising the antenna mount until the antenna is positioned to read the transponder on a next case to be loaded;
   f) if there are more cases to be picked, repeating the method from step (a).

20. The method of claim 19, in which the method starts, before step (a), with the antenna mount at the base level and the pallet empty.

21. The method of claim 19, in which step (f) further comprises the steps of locating the next item on the pick list and driving the conveyance to a location of the next item.

22. The method of claim 19, in which step (d) further comprises the steps of comparing the case picked with a pick list, and displaying a message if there has been an error.

23. The method of claim 19, in which step (d) further comprises the steps of comparing the case picked with a pick list, and displaying a confirmation if the case is on the pick list.

24. The method of claim 19, in which the apparatus further comprises a barcode reader aligned with the object sensor, and the method further comprises the step, after step (b), of reading barcode information from the case, and step (c) further comprises decoding the barcode information.

25. The method of claim 24, in which the apparatus further comprises a motion sensor adjacent to the barcode reader, and the step of claim 24 is initiated when the motion sensor detects motion.

26. The method of claim 19, further comprising the step, after step (c) of communicating through a wireless link with a warehouse computer.

27. The method of claim 19, in which the displaying step (d) further comprises displaying information selected from a group comprising, a total number of items read since a picking operation was started, transponders read since a picking operation was started, a total number of items read since the conveyance last stopped, and transponders read since the conveyance last stopped.

28. The method of claim 19 in which the apparatus further comprises a fixed antenna mounted adjacent to the pallet support and coupled to the interrogator, and the method further comprises:

before step (a), the steps of:
   loading a pallet on the pallet support;
   reading a pallet transponder on the pallet with the fixed antenna;
   communicating with a warehouse computer to determine contents of the pallet;
   if the warehouse computer indicates that there are cases already expected to be on the pallet; downloading identification of the cases expected to be on the pallet;
in step (d):
   displaying the cases expected to be on the pallet; and
   displaying any discrepancies between the cases found to be actually on the pallet in steps (a) through (d) and the cases expected to be on the pallet downloaded from the warehouse computer.

29. The method of claim 19 further comprising:

before step (a), the steps of:
   loading a pallet on the pallet support;
   interrogating a transponder from at least one case on the pallet and decoding an identity of at least one case;
   communicating with a warehouse computer to determine contents of the pallet associated with the at least one case;
   if the warehouse computer indicates that there are cases already expected to be on the pallet with the at least one case; downloading identification of the cases expected to be on the pallet;
in step (d):
   displaying the cases expected to be on the pallet; and
   displaying any discrepancies between the cases found to be actually on the pallet in steps (a) through (d) and the cases expected to be on the pallet downloaded from the warehouse computer.

* * * * *